United States Patent

Marcus et al.

[11] Patent Number: 5,586,183
[45] Date of Patent: Dec. 17, 1996

[54] EXTENDABLE TELEPHONE HANDSET WITH FLEXIBLE ELECTRICAL INTERCONNECTION AND MATCHED IMPEDANCE ACOUSTICAL INTERFACE

[75] Inventors: Larry A. Marcus, Fishers; William J. McLaughlin, Indianapolis, both of Ind.

[73] Assignee: Lucent Technologies Inc., Murray Hill, N.J.

[21] Appl. No.: 630,227

[22] Filed: Apr. 10, 1996

Related U.S. Application Data

[63] Continuation of Ser. No. 287,986, Aug. 9, 1994, abandoned.
[51] Int. Cl.⁶ .................................................. H04M 1/00
[52] U.S. Cl. .................................... 379/433; 379/434
[58] Field of Search .................................. 379/428, 429, 379/433, 430, 434, 443; D14/138, 248, 140, 147, 240

[56] References Cited

U.S. PATENT DOCUMENTS

| | | | |
|---|---|---|---|
| 4,272,655 | 6/1981 | MacKenzie | 379/433 |
| 4,932,052 | 6/1990 | Lo | 379/430 |
| 5,151,946 | 9/1992 | Martensson | 379/433 |
| 5,291,541 | 3/1994 | Gibler et al. | 379/443 |

FOREIGN PATENT DOCUMENTS

| | | | |
|---|---|---|---|
| 3-263957 | 11/1991 | Japan | 379/428 |

*Primary Examiner*—Krista M. Zele
*Assistant Examiner*—Jack Chiang

[57] ABSTRACT

A compact telephone handset, when not in use, is shorter in length than the distance between a user's ear and mouth and has an extendable boom for lengthening the telephone to a length equal to the distance between the user's ear and mouth. The handset has a receiver device and a microphone device with one of the devices being located on the main body of the handset and the other device being located on a slidable boom which is extendable and retractable relative to the main body.

35 Claims, 3 Drawing Sheets

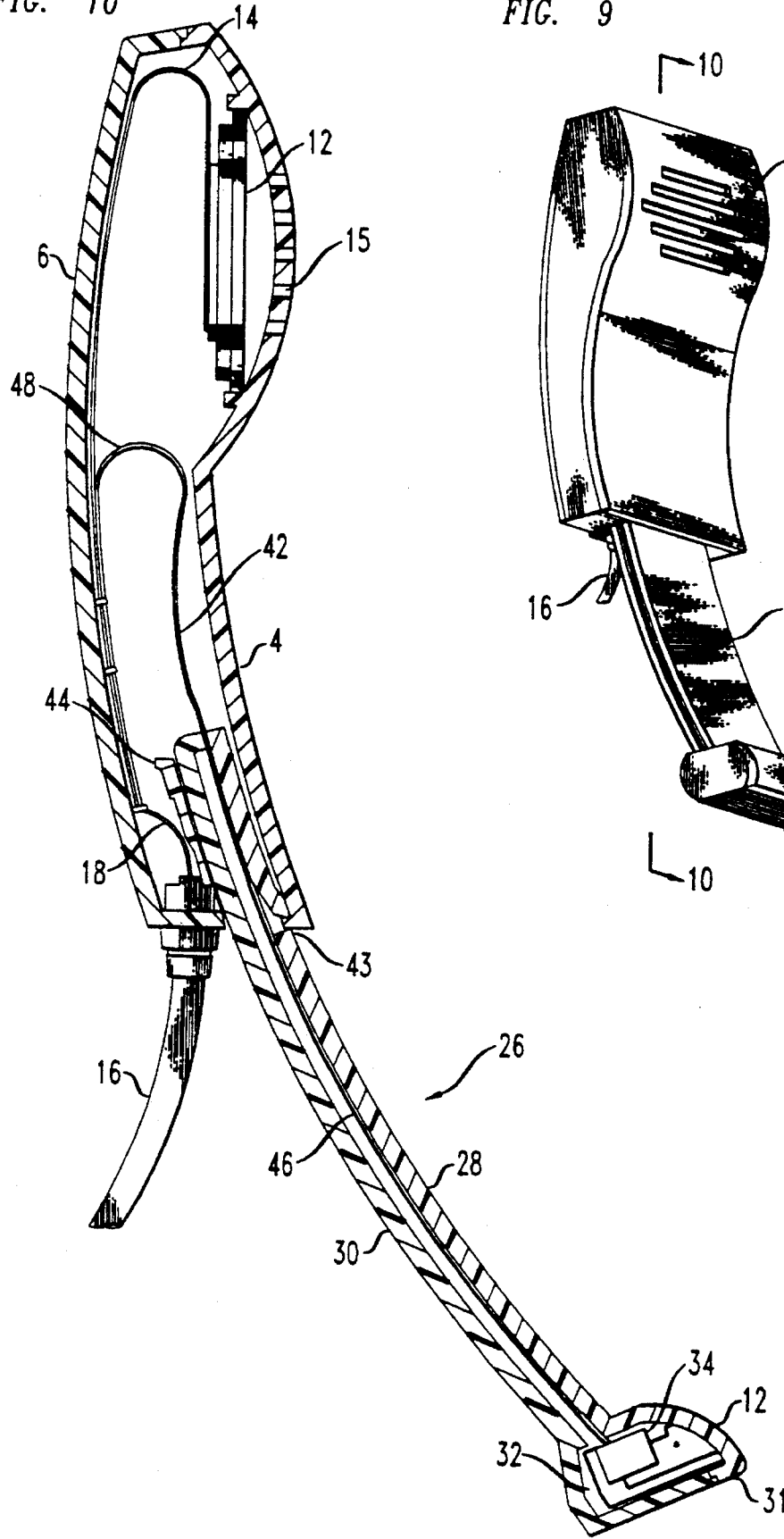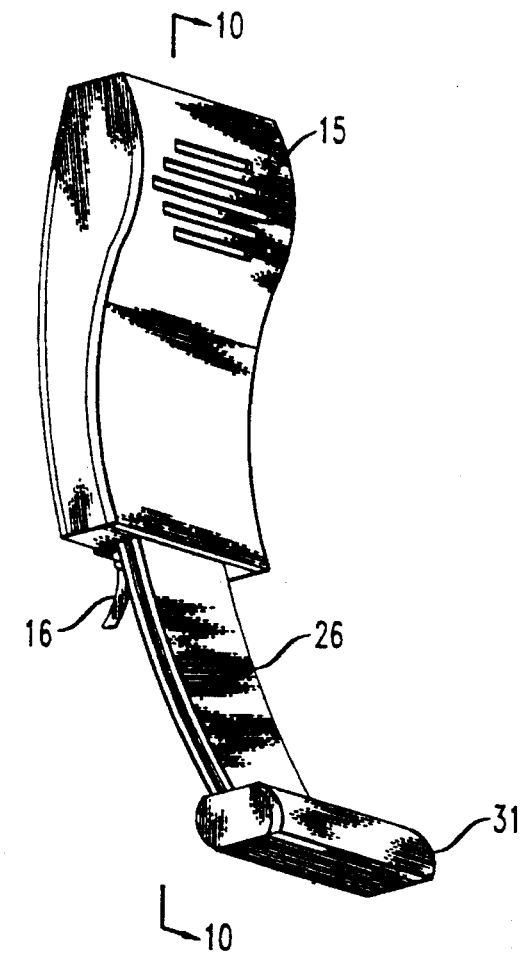

EXTENDABLE TELEPHONE HANDSET WITH FLEXIBLE ELECTRICAL INTERCONNECTION AND MATCHED IMPEDANCE ACOUSTICAL INTERFACE

This application is a continuation of application Ser. No. 08/287,986 filed Aug. 9,1994, which has been abandoned.

BACKGROUND OF THE INVENTION

This invention relates to a telephone handset and more particularly to a compact telephone handset.

Compact telephone handsets are desirable, but the ability to make them compact is limited by the fact that it is necessary to maintain the modal position, that is, the distance from the receiver to the microphone so that the receiver and microphone will be optimally positioned adjacent the user's ear and mouth, respectively. The modal position may be six inches, for example, and the telephone set heretofore would have to be of a corresponding size. In view of the above, heretofore, the provision of a compact telephone set has been limited by the need to maintain the modal position.

SUMMARY OF THE INVENTION

Accordingly, it is an object of the present invention to overcome the disadvantages associated with known compact telephone handsets and to provide a compact telephone handset having an optimum modal position when in use while being more compact than the optimum modal position when not in use.

The compact telephone handset of the present invention has a receiver at one end and a microphone at the other. An extendable boom is slidably mounted on the handset body for increasing the distance between the microphone and receiver to at least an optimum modal distance when the handset is in use. However, when the handset is not in use, the slidable boom is slidable back into the handset body to thereby reduce the overall size of the handset.

The above and other objects, features and advantages of the invention will become readily apparent from the following detailed description thereof which is to be read in connection with the accompanying drawings.

BRIEF DESCRIPTION OF THE DRAWINGS

FIG. 9 is a perspective view of the compact telephone handset showing the boom in an extended position.

FIG. 10 is a cross-section of the telephone handset taken along the line 10—10 in FIG. 9.

DESCRIPTION OF THE PREFERRED EMBODIMENTS

Figure 1:
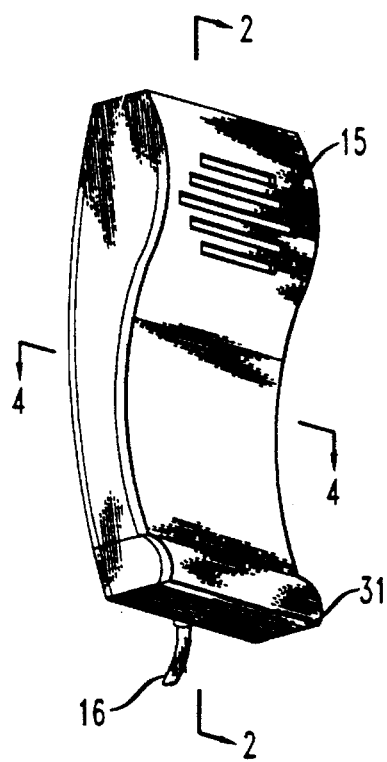
FIG. 1 is a perspective view of a compact telephone handset according to one embodiment of the invention showing the boom retracted into the handset body.

Referring to the drawings, there is shown a telephone handset which includes a handset body indicated generally at 2 and which consists of a handset deck 4 and a handset shell 6 which are joined together by adhesive or the like such as indicated at 8. The joined handset deck 4 and handset shell 6 define a hollow interior indicated at 10 and disposed within the hollow interior 10 is a receiver 12 which may be secured to the handset deck 4 by adhesive or the like as indicated at 13. A plurality of spaced port openings 15 are provided in the handset deck 4 at a position facing the receiver 12. There may be openings, such as slots, not shown, located on a rear face of the handset shell 6 opposite the receiver 12. These openings are not required, but may be used to aid the operation of the receiver 12 operating as an acoustical vent.

Figure 3:
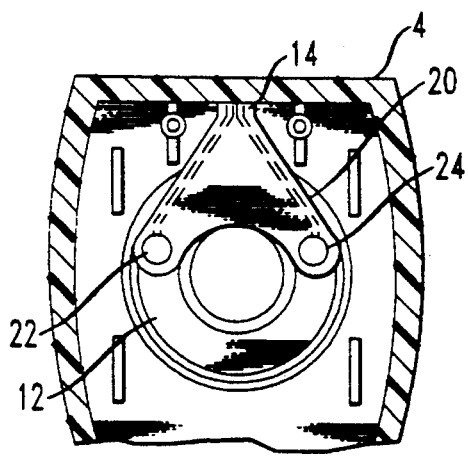
FIG. 3 is a partial cross-section taken along the line 3—3 in FIG. 2.
Figure 4:
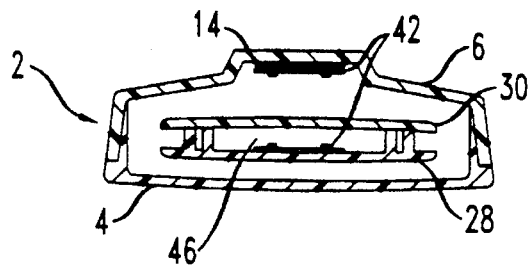
FIG. 4 is a cross-section taken along the line 4—4 in FIG. 1.

A receiver flexible cable 14 is connected to the receiver 12 and extends along the inside of the handset shell 6 to a position adjacent to a flexible cord 16 which connects the handset to a communication receptacle, for example, a walljack or a cellular modem for a personal computer. Alternatively, the telephone handset of the present invention could be used as a cordless telephone. The cable 14 is stationarily fixed in position on the handset and has one end connected to the cord 16 by cord leads 18. The cable 14 shown in the drawings has the configuration of a ribbon, but the end juxtaposed to the receiver 12 has a flared section 20 to facilitate in providing a suitable connection between the cable 14 and the receiver 12. The connection may be by solder such as shown at 22 and 24 in FIG. 3. Thus it will be seen that the receiver 12 is connected to the cord 16 by the cable 14 and the cord leads 18.

Slidably and extendably mounted in the handset body 2 is a boom indicated generally at 26. The boom 26 consists of a microphone deck 28 and a microphone shell 30 suitably joined by adhesive or the like. A passageway 46 is provided between the microphone deck 28 and the microphone shell 30. The boom 26 has an outer end which is enlarged as indicated at 31 to define an enclosure 32 for receiving and retaining a microphone 34. A gasket 38 and resilient material 40 may be provided in the enclosure 32 to facilitate mounting of the microphone 34. The enclosure 32 has one or more ports 47 opposite the microphone 34.

Figure 2:
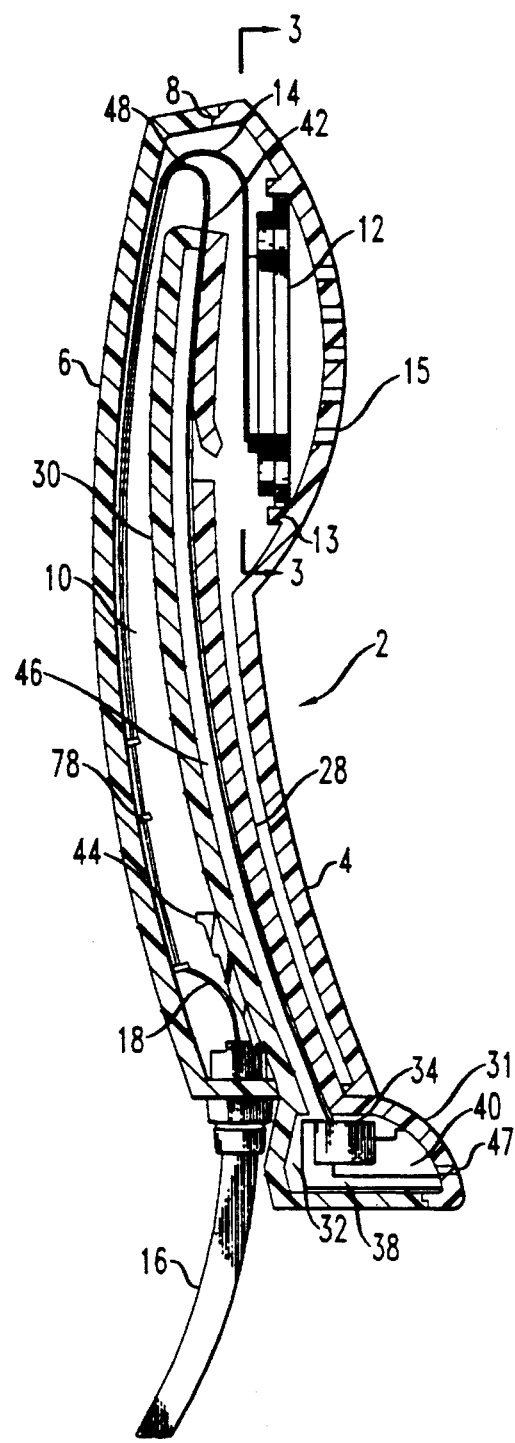
FIG. 2 is a cross-section taken along the line 2—2 in FIG. 1.

The boom 26 passes through an opening 43 in the end of the handset body 2 and can be manually slid between a retracted position shown in FIGS. 1 and 2 and an extended position shown in FIGS. 9 and 10. The handset shell 6 is provided with a slider block 44 which is operable to slidably engage the boom 26 to facilitate sliding of the boom 26 between its retracted and extended positions.

A microphone flexible cable 42 extends along the boom by passing through the passageway 46 between the microphone deck 28 and the microphone shell 30. The cable 42 has one end connected to the microphone 34 while the other end extends from the end of the boom 26 into the hollow interior 10 of the handset body 2. The cable 42 is disposed to make a U-turn, as indicated at 48, within the hollow interior 10 and to double back on itself along the bottom of the handset shell 6 to a position adjacent to the cord 16 to which the cable 42 is connected via the cord leads 18.

The end portion of the cable 42 at the bottom of the handset shell 6 adjacent the cord 16 is fixed to the bottom of the handset shell 6. However, the intermediate portion of the cable 42 is not fixed and is free to flex from one position in which the boom 26 is retracted as shown in FIG. 1 and another position in which the boom is extended as shown in FIG. 10. When the boom 26 is in its retracted position, a portion of the cable 42 which has been extended now rests on the bottom of the handset shell 6. This can be readily seen upon comparing FIGS. 2 and 10.

In the extended position of the boom 26 shown in FIGS. 9 and 10 the distance between the microphone 34 and the receiver 12 corresponds to the modal position hereinbefore discussed. In the retracted position of the boom 26 as shown in FIG. 2, the overall length of the handset is considerably foreshortened, and shorter than the optimum modal distance, thereby providing a compact telephone handset. An average distance between a user's ear and mouth, representing an average optimum modal distance, is approximately six inches. However, the optimum distance varies depending on the user. Accordingly, the boom 26 is able to extend the appropriate distance to accommodate the user.

Figure 5:
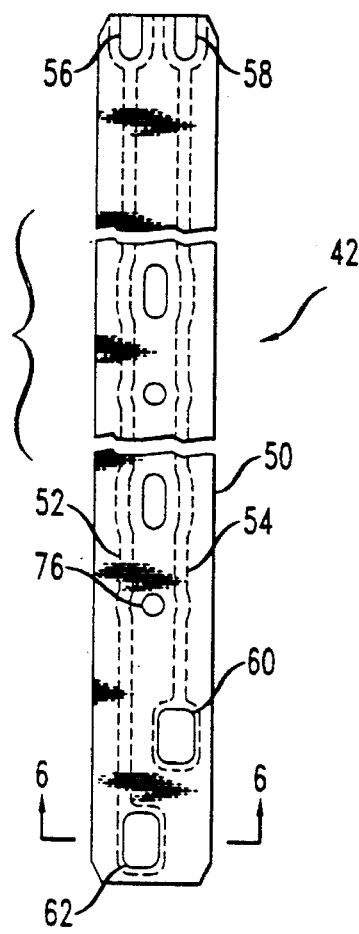
FIG. 5 is a plan view of a flexible microphone cable which has been partly broken away.
Figure 6:
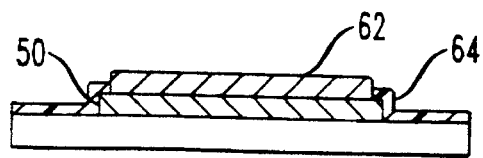
FIG. 6 is a cross-section taken along line 6—6 in FIG. 5

As shown in FIGS. 5 and 6 the microphone cable 42 has a ribbon like structure which includes a flexible insulator film 50 (e.g. polyamide) on which there are disposed two separate conductors 52, 54 (e.g. copper), the two separate conductors 52, 54 being insulated from one another by the insulation film 50 and extending the length of the cable 42 from the microphone 34 to the previously mentioned cord leads 18. Solder pads 56, 58 60 and 62 are provided at the respective end portions of each conductor 50, 52 to facilitate making a solder connection with the microphone 34 and the cord leads 18. A protective coating 64 may be provided on the exposed conductors and insulators.

Figure 7:
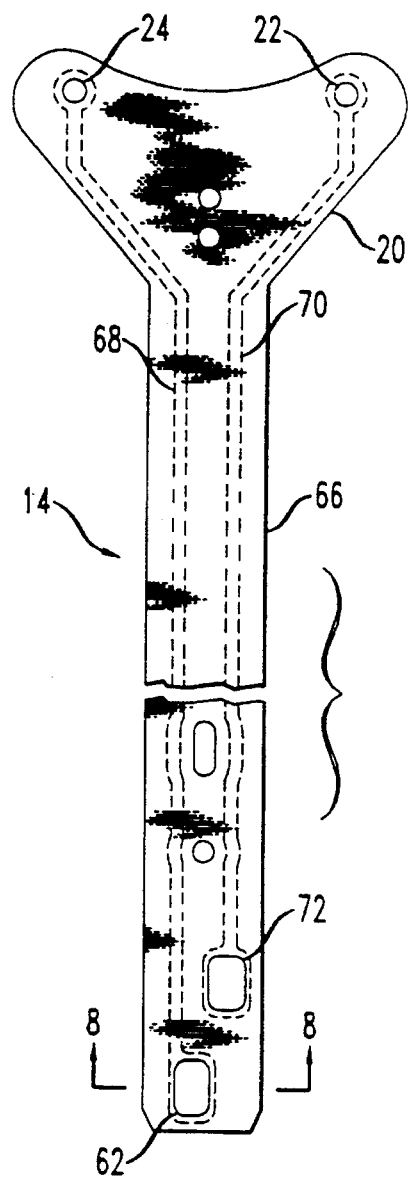
FIG. 7 is a plan view of a flexible receiver cable which has been partly broken away.
Figure 8:
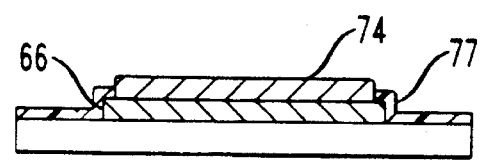
FIG. 8 is a cross-section taken along line 8—8 in FIG. 7.

As shown in FIGS. 7 and 8 the receiver cable 14 has a ribbon-like structure which includes flexible insulator film 66 (e.g. polyamide) on which there are disposed two separate conductors 68, 70 (e.g. copper), the cable 14 with its conductors 68, 70 extending from the receiver 12 to the cord leads 18, previously mentioned. The conductors 68, 70 are connected by solder to the receiver 12 as indicated at 22 and 24 and to the cord leads 18, the connection to the cord leads 18 being made utilizing the solder pads 72, 74 shown in FIG. 7. A protective coating 77 may be provided over exposed conductors and insulator.

Suitable openings, for example as shown at 76 in FIG. 5 may be provided to facilitate securing part of the cable 42 to the handset shell 6. Also projections, for example as shown at 78 in FIG. 2, may also be provided on the handset shell 6 to receive the opening 76 to facilitate securing the end portions of the cable 42 to the handset shell 6.

The boom 26 of the handset must slide without binding. Therefore, it is preferred to make the surfaces on which it slides, that is the slider block 44, of a different material having a low coefficient of friction such as acetal plastic (commercially available, for example, as DuPont Delrin®). The handset boom and body parts may be made of regular telephone material, e.g. ABS (Acrylonitrile Butadiene Styrene, commercially available, for example, as Borg-Warner/GE Cycolac®.

It is possible to use various types of flexible cables for the flexible microphone cable 42 and the flexible receiver cable 14. For example, the flexible cables used in hard disk drives for moving the head or used with print heads can be used in the present invention. Other thin laminate materials may also be used for the flexible cables. It is desirable that the flexible microphone cable 42 be capable of many flexures. An example of a flexible cable designed to be capable of many flexures is one having a polyamide base film insulator with copper conductors deposited thereon.

Examples of flexible cables which may be used are disclosed in U.S. Pat. Nos. 5,112,462 and 5,137,791 which are herein incorporated by reference.

Although the flexible cables 14, 42 are shown as having a ribbon-like configuration, other configured cables may be used such as cables having a circular, oval, polygonal or other type of cross sectional configurations.

Since the receiver cable 14 is fixed in position in the handset, such receiver cable 14 does not have to repeatedly flex like the flexible microphone cable 42. Accordingly, the receiver cable 14 need not have such flexible properties and can be made from one or more different materials than the flexible microphone cable 42.

Applicant's invention utilizes a flexible cable means which flexes when the boom 26 moves between extended and retracted positions. Accordingly, applicant's invention requires a minimum voltage, for example compared to that when using sliding contacts. Although sliding gold contacts could require almost as low a voltage, the high cost thereof would be a deterrent. The avoidance of sliding contacts also eliminates the electrical noise associated therewith.

Since the receiver cable 14 is flexible, like the microphone cable 42, the positions of the receiver 12 and the microphone 34 may be reversed by placing the receiver 12 on the end of the boom 26 and the microphone 34 on the end of the handset body 2 by suitably adapting the flexible cables to the new positions.

It will be seen that the telephone handset disclosed herein may be made compact with a length less than the modal length, but which is provided with a slidable boom 26 having a microphone 34 at one end of the boom 26 such that the boom 26 can be slidably extended to place the microphone 34 at the modal position relative to the receiver 12. Thus the handset may be retained in its compact disposition when not in use and the user need only manually extend the boom 26 when the user desires to use the handset.

During operation of the handset, the boom 26 is preferably extended to the optimum modal distance to enable a user to most clearly hear the transmission through the receiver 12 and to allow the user to transmit most clearly through the microphone 34. However, the handset may still be used even if the boom 26 is not extended, provided the user either speaks loud enough so that the microphone 34 can pick up the transmission when placed at a distance from the user's mouth, or listens very closely so that the user can receive the transmission from the receiver 12, even if the receiver 12 is not near the user's ear.

In conventional telephone handsets, a high acoustic impedance receiver (sometimes referred to as a HAIR) is used that must cover the ear well (i.e. have a good ear seal). High acoustic impedance indicates that the diaphragm has a high stiffness which leads to a high resonant frequency of the diaphragm. Conventional receivers have an in-place resonant frequency of about 2,000 Hz. The high output at resonance is controlled by other acoustic cavities in the receiver so that the overall frequency response is "flat" or "smooth". Because the HAIR equipped receiver must cover the ear well, this leads to rather large receiver ends on conventional handsets. To make small handsets, it is necessary to use a receiver design that doesn't require an ear seal. Such receiver design is called a low acoustic impedance receiver (LAIR) meaning that its diaphragm resonance is low in frequency and, therefore, its diaphragm stiffness is low. A LAIR can have an in-place diaphragm resonance of about 300 Hz.

The receiver shown at 12 is such a LAIR design. A LAIR is similar to a high fidelity headphone transducer and doesn't require an ear seal. A complete ear seal may adversely affect the LAIR's frequency response. Therefore, a curved end on the small handset indicated at 15 in FIG. 2 can prevent a complete ear seal and, thus, preserve and control the LAIR's frequency response. The curved receiver end also complements the overall design aesthestics of the handset.

Having described the invention with reference to the accompanying drawings, it will be appreciated that the present invention is not limited to the precise device explained in that various changes and modifications can be effected therein by one of ordinary skill in the art without departing from the scope or spirit of the invention as defined by the appended claims.

What we claim is:

1. A telephone handset comprising:

a handset body structure having a first transducer mounted therein;

a boom structure having a second transducer fixed thereto;

said first transducer being one of a microphone and a receiver and said second transducer being another one of said microphone and receiver;

slide means for slidably coupling said boom structure and said handset body structure for sliding movement between a retracted position and an extended position such that a distance between said microphone transducer and said receiver transducer changes as said boom is slid between said retracted and extended positions;

a flexible ribbon cable, connected to said second transducer and a fixed location in said handset body structure, said flexible cable having sufficient length to extend between said fixed location and said second transducer when said boom moves between said extended position and said retracted position; and said flexible ribbon cable having a generally U-shaped configuration in the range of 180° as defined by a U-bend disposed such that substantially all flexing occurs at the U-bend while the position of the U-bend changes as the boom is slid between said retracted and extended positions.

2. A telephone handset according to claim 1 wherein said first transducer is said receiver.

3. A telephone handset according to claim 1 wherein said first transducer is said microphone.

4. A telephone handset according to claim 1 wherein said handset body structure has a cord connection means for connecting a cord to the handset, said first transducer is said receiver and a receiver flexible cable connects said receiver to said cord connection means.

5. A telephone handset according to claim 4 wherein said second transducer is said microphone and said fixed location is said cord connection means.

6. A telephone handset comprising:

a microphone means and a receiver means; and slidable means for slidably coupling said microphone means and said receiver means;

said slidable means including a flexible cable means connected to one of said receiver means and microphone means; and said flexible cable means having an intermediate portion with a U-bend in the range of 180° which is displaceable along said intermediate portion and whereat substantially all flexing occurs during relative movement between said microphone means and said receiver means, whereby the telephone handset enables a distance between said microphone means and said receiver means to be varied.

7. A telephone handset according to claim 6 wherein:

said receiver means includes an elongated handset body defining an interior space and a receiver device mounted therein;

said handset body having one longitudinal end portion defining an opening accessing said interior space;

said microphone means including an elongated boom having a microphone device mounted thereon; and said slidable means for slidably supporting said boom for sliding movement operating through said opening and within said interior space.

8. A telephone handset according to claim 7 wherein:

said handset body has another longitudinal end portion at which said receiver device is installed;

said interior space in said handset body is an elongated interior passage extending from said one longitudinal end portion to said other longitudinal end portion; and said boom is slidable in and out of said elongated interior passage between said retracted and extended positions.

9. A telephone handset according to claim 8 wherein said boom has one longitudinal end portion on which said microphone device is mounted and another longitudinal end portion which is adapted to be received in said interior passage of said handset body.

10. A telephone handset according to claim 9 wherein said other longitudinal end portion of said boom underlies said receiver device when said boom is in said retracted position.

11. A telephone handset according to claim 9 wherein said one longitudinal end portion of said boom on which said microphone device is mounted has an enlarged microphone housing section for housing said microphone device, and said enlarged microphone housing section has a larger cross section than a cross section of a remainder of said boom.

12. A telephone handset according to claim 11 wherein said boom has a retracted position in which said microphone housing section is disposed juxtaposed to said opening and a remainder of the boom is disposed in said elongated interior passage.

13. A telephone handset according to claim 11 wherein:

said boom has an extended position in which said microphone housing section is spaced from said opening in said handset body and said other longitudinal end portion of said boom is juxtaposed to said opening in said handset body;

said boom has said intermediate portion between said one and said other longitudinal end portion; and said intermediate portion of said boom is disposed externally of said interior space when said boom is in said extended position.

14. A telephone handset according to claim 12 wherein said one longitudinal end portion of said handset body comprises end connection means for connecting a cord means to said handset body.

15. A telephone handset according to claim 14 wherein said cord means has an end fitting which underlies said microphone housing section when said boom is in said retracted position.

16. A telephone handset according to claim 8 wherein said interior space of said handset body has a bottom, said flexible cable means has one end portion engagingly dispose against said bottom and another end portion disposed in said boom, said flexible cable means has said intermediate portion between said one and said other longitudinal end portions.

17. A telephone handset according to claim 16 wherein the position of said U-bend portion of said flexible cable means changes position along the longitudinal length of said handset body as said boom moves between said retracted and extended positions.

18. A telephone handset according to claim 16 wherein said handset body comprises a cord connection means, said one end portion of said flexible cable means is connected to said cord connection means and said other end portion of said flexible cable means is connected to said microphone device.

19. A telephone handset according to claim 18 wherein said other longitudinal end portion of said flexible cable means is disposed within said boom.

20. A telephone handset according to claim 16 wherein said one longitudinal end portion of said flexible cable means is disposed between said bottom of said handset body and said boom when said boom is in said retracted position.

21. A telephone handset according to claim 16 further comprising:

said handset body having a cord connecting means for connecting a cord to said handset body;

a second flexible cable means in said interior passage of said handset body, said second flexible cable means having one end portion connected to said receiver device and another end portion extending in part along said bottom of said handset body; and said other end portion being connected to said cord connection.

22. A telephone handset according to claim 21 wherein said second flexible cable means is disposed in a stationary position in said handset body.

23. A telephone handset according to claim 21 wherein said other end portion of said first flexible cable means and said other end portion of said second flexible cable means are disposed juxtaposed and generally parallel to one another on said bottom of said interior space.

24. A telephone handset according to claim 21 wherein said second flexible cable means has a U-bend and said U-bend of said first flexible cable means and said U-bend of said second flexible cable means are juxtaposed to one another when said boom is in said retracted position.

25. A telephone handset according to claim 7 wherein said handset body and said boom each have a generally curvilinear configuration of substantially the same curvature.

26. A telephone handset according to claim 7 wherein said flexible cable means is in the form of a ribbon.

27. A telephone handset according to claim 7 wherein said flexible cable means comprises a film of insulating material and conductors embedded in said insulating material.

28. A telephone handset according to claim 7 wherein said receiver means comprises a receiver device mounted within a support structure, said support structure having a receiver face adapted to be juxtaposed to a person's ear when the handset is in use, said receiver face having openings juxtaposed to said receiver device, said receiver face having an arcuate configuration.

29. A telephone handset according to claim 28 wherein said receiver face has a convex configuration.

30. A telephone handset according to claim 7 wherein said receiver means includes a low accoustic impedance receiver.

31. A telephone handset according to claim 30 wherein said receiver means has a diaphragm resonance of about 300 Hz.

32. A telephone handset comprising:

a first housing member having a first transducer disposed within a first end of said first housing member and a second end defining an opening to a first housing interior cavity;

a second housing member having a second transducer disposed within a first end of said second housing member and a second end defining an aperture;

said first transducer being one of a microphone and a receiver and said second transducer being another one of said microphone and receiver;

slide means for slidably coupling said second housing member within said first housing member with the second housing member sliding in and out through said opening in said first housing member between extended and retracted positions to permit a user to vary a distance between said receiver and microphone transducers;

a flexible ribbon cable connected to said first transducer and a fixed position in said second housing member and being disposed in part between an inside surface of said interior cavity of said first housing member and an outside surface of said second housing member when said second housing member is in said retracted position, said flexible ribbon cable having sufficient length to extend over a range of relative positions of said first and second housing members; and said flexible cable having a bend in the range of 180°, varying in position along said flexible cable through a range of operation of said slide means, whereat substantially all flexing operation occurs.

33. The telephone handset of claim 32 wherein said flexible ribbon cable includes a flexible insulator sheet having conductors printed thereon.

34. The telephone handset of claim 32 further comprising:

a convex structure housing said receiver and adapted to interface with a user's ear; and said receiver having a low acoustic impedance, said low acoustic impedance being matched to an acoustic impedance presented by said interface of said convex structure and said user's ear.

35. The telephone handset of claim 32 wherein said receiver has a diaphragm resonance in the range of 300 Hz defining said low acoustic impedance.

* * * * *